United States Patent [19]

Hasuike

[11] Patent Number: 5,078,230
[45] Date of Patent: Jan. 7, 1992

[54] FRONT STRUCTURE OF A MOTOR VEHICLE

[75] Inventor: Toshio Hasuike, Yamaguchi, Japan

[73] Assignee: Mazda Motor Corporation, Japan

[21] Appl. No.: 496,389

[22] Filed: Mar. 20, 1990

[30] Foreign Application Priority Data

Mar. 20, 1989 [JP] Japan .................................. 1-68763

[51] Int. Cl.⁵ .............................................. B60K 5/00
[52] U.S. Cl. .................................... 180/291; 180/148
[58] Field of Search ...................... 180/291, 148, 79.1, 180/79.3, 79, 297, 146, 147

[56] References Cited

U.S. PATENT DOCUMENTS 4,716,984  1/1988  Hiramatsu et al. ................. 180/297

FOREIGN PATENT DOCUMENTS 61-19936  6/1986  Japan .
63-23219  6/1988  Japan .

Primary Examiner—Andres Kashnikow
Assistant Examiner—Richard Camby
Attorney, Agent, or Firm—Thompson, Hine and Flory

[57] ABSTRACT

A transmission mechanism of a steering system and a front cross member are mounted in the forward position of an engine inside an engine compartment. A housing portion is provided under the front cross member to accommodate the transmission mechanism. This arrangement realizes wider space for disposing auxiliary components as well as protection of the transmission mechanism in case of collision of the vehicle.

10 Claims, 6 Drawing Sheets

FRONT STRUCTURE OF A MOTOR VEHICLE

BACKGROUND OF THE INVENTION (a) Field of the Invention

This invention relates to a front structure of a motor vehicle, and more particularly to a vehicle body structure for use in front-midship type vehicles having engines mounted in the rearward position of front wheels inside an engine compartment provided in the front of a vehicle cabin.

(b) Description of the Prior Art

As a typical steering system in motor vehicles, the following has been known in the art. A steering shaft is extended from a steering wheel in a vehicle cabin toward the front of the vehicle body. Connected with the front end of the steering shaft through a transmission mechanism, such as rack and pinion mechanism, is a tie rod extending transversely to the longitudinal direction of the vehicle body. Provided on both right and left ends of the tie rod are knuckle arms to which front wheels are installed. Upon turning the steering wheel, the steering shaft rotates. This rotation of the steering shaft causes the tie rod to travel in the widthwise direction of the vehicle body. Then the knuckle arms pivotally move, thereby steering the front wheels.

Japanese Utility Model Publication Gazette No. 61-19936 discloses the following structure. A steering rack with which a steering shaft is connected is disposed in the rearward position of an engine inside an engine compartment. The steering rack is supported by a frame member extending in the widthwise direction of the vehicle body.

On the other hand, in a front-midship type motor vehicle having an engine disposed in the rearward position of a front wheel inside an engine compartment, an axle of front wheels is located in the forward position of the engine. Accordingly, a steering shaft passes through the lower position of the engine to be connected with a steering rack which is located in the forward position of the engine. This means that the steering rack transversely extends in the vicinity of a front cross member mounted in the front end of a vehicle body frame.

However, in this type of motor vehicles, the steering rack is increasingly susceptible to the shock load upon a head-on collision of the vehicle, resulting in deformation of the steering rack. This is because the steering rack is disposed in the front end of the vehicle body as well as in the forward position of the engine.

Additionally, the front cross member extending in the widthwise direction of the vehicle body is located in the forward position of the engine. This means that both the steering rack and the front cross member are disposed in the space in front of the engine. Namely, only the limited space is available for arranging other auxiliary components.

SUMMARY OF THE INVENTION

The object of the present invention is to improve the structure of the front cross member and the arrangement of the transmission mechanism, thereby obtaining wider space for the layout of auxiliary components as well as protecting the transmission mechanism in case of a head-on collision of the vehicle.

To achieve the above-mentioned objects, a vehicle of the present invention has the front structure with the following features. First, a motor vehicle in accordance with the present invention is defined in such a manner that the transmission mechanism of the steering system and the front cross member are respectively mounted forward of the engine. The engine is mounted substantially about the front cross member. The lower portion of the front cross member is indented to form a housing portion for accommodating the transmission mechanism. With this structure, space in front of the engine will not be limited and small by the arrangement of the transmission mechanism, thus obtaining sufficient space for the layout of auxiliary components. In addition, the transmission mechanism can be protected in case of a head-on collision of the vehicle, since the shock load does not act directly on the transmission mechanism.

BRIEF DESCRIPTION OF THE DRAWINGS

FIGS. 1 through 4 illustrate a first embodiment of the present invention, in which:

FIG. 1 is a perspective view showing a vehicle body structure inside an engine compartment;

FIG. 2 is a sectional view taken along the line II—II in FIG. 1;

FIG. 3 is a plan view showing the inside of the engine compartment;

FIG. 4 is a perspective view showing the vicinity of an end portion of a front side frame.

FIGS. 6 and 7 illustrate a third embodiment of the present invention, in which:

FIG. 6 is is a perspective view showing a vehicle body structure inside an engine compartment;

FIG. 7 is a sectional view taken along the line VII—VII in FIG. 6.

DETAILED DESCRIPTION OF THE INVENTION (a) First Embodiment

Figure 1:
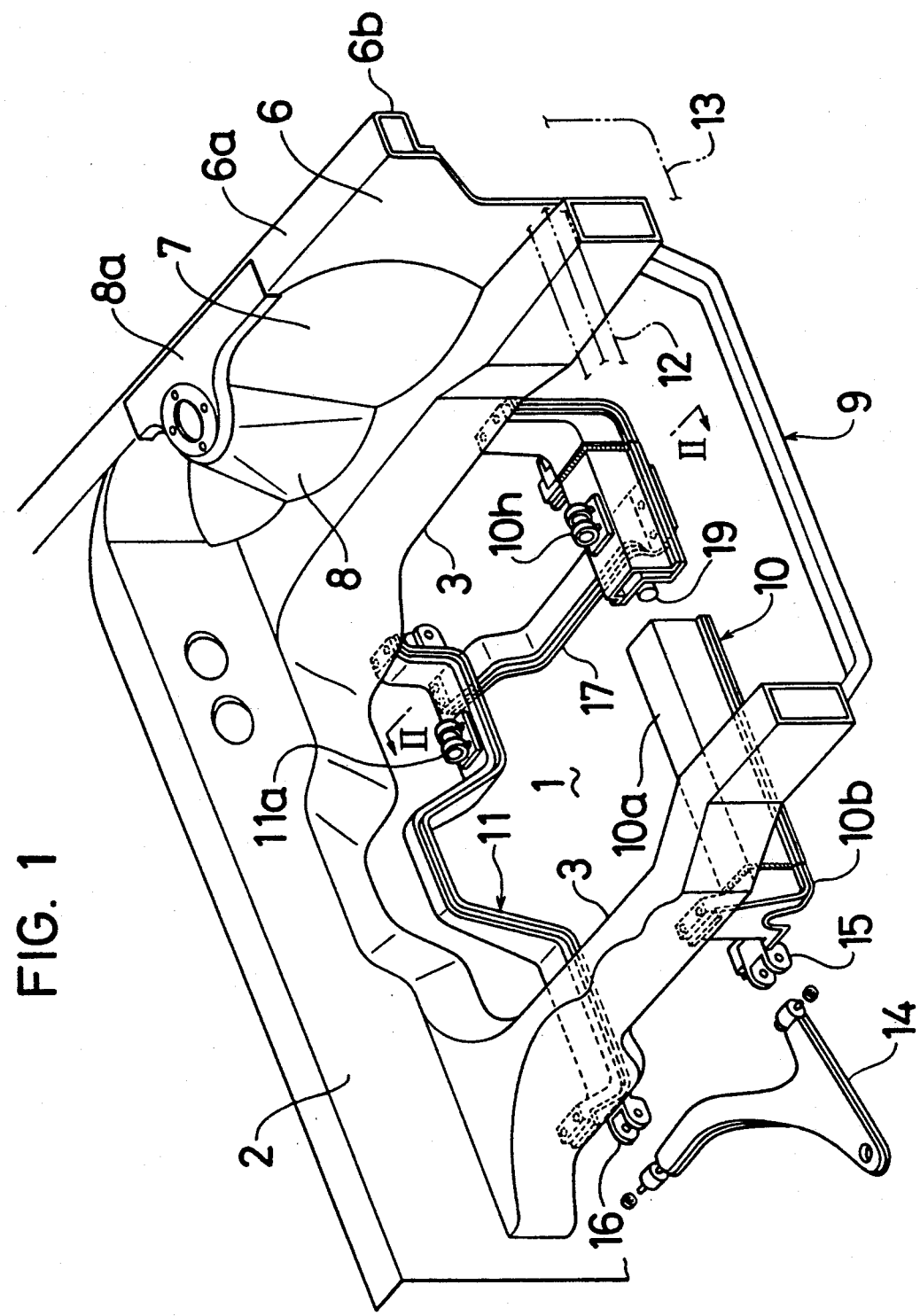
Figure 2:
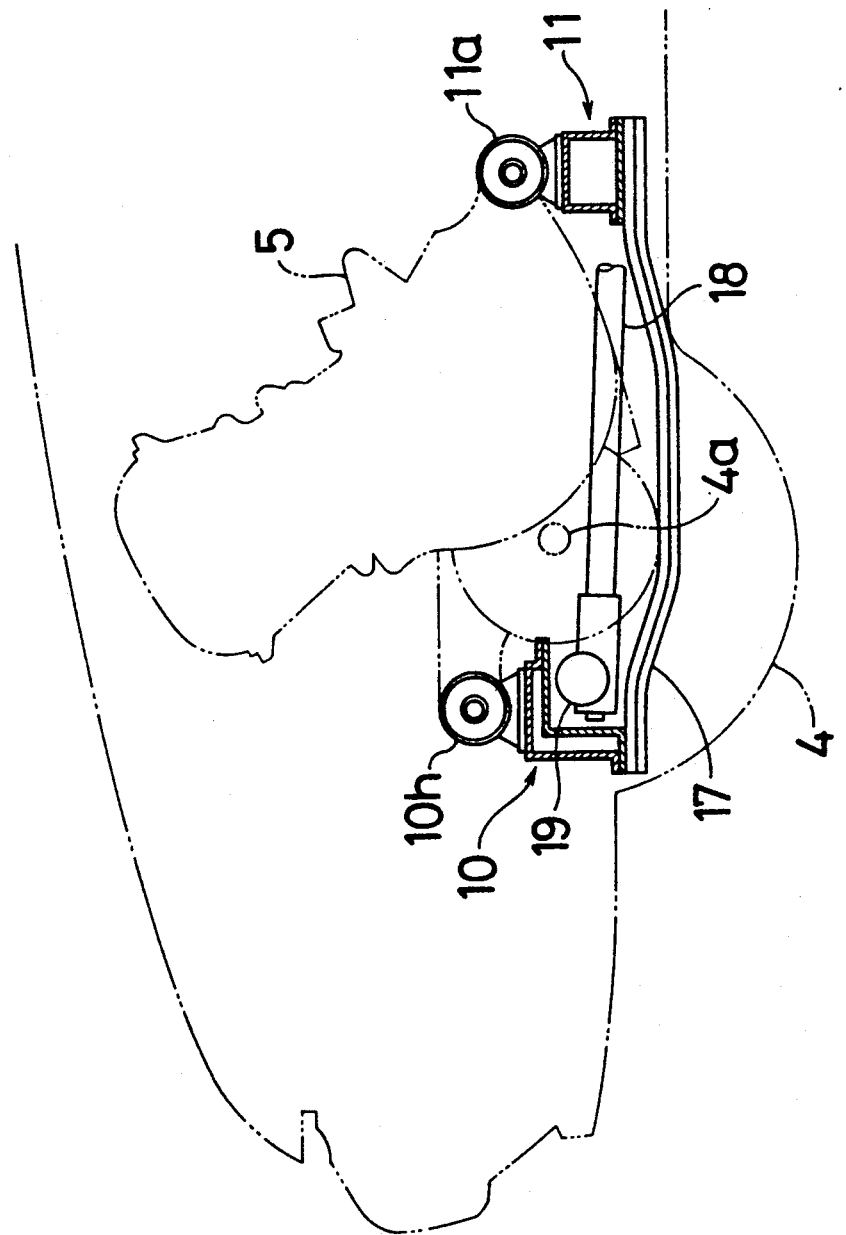

As shown in FIG. 2, this motor vehicle is of frontmidship type wherein a power plant 5 comprising an engine and a transmission is located rearward of an axle 4a of a front wheel 4. Referring to FIG. 1, front side frames 3 having a closed cross-section extend forwardly from both right and left sides of a dash panel 2 which forms a rear end of an engine compartment 1.

Joined with an outer side-surface of the front side frame 3 is a wheel housing 7 which is integrated with a wheel apron 6 as one unit. A suspension tower 8 supporting a suspension (not shown in the drawings) is provided at the longitudinal center of the wheel housing 7. An upper end portion 6a of the wheel apron 6 forms a closed cross-section together with a wheel apron reinforcement 6b. An upper edge 8a of the suspension tower 8 is joined with an upper surface of the upper end portion 6a of the wheel apron 6.

Right and left front side frames 3, 3 are provided, in order from the front of the vehicle body, with transversely extending shroud lower 9, suspension front cross member 10 and suspension rear cross member 11.

The shroud lower 9 forming a front end of the vehicle body frame together with a shroud upper 12 is provided with a shroud panel 13 for holding a radiator or a head lamp (not shown in the drawings).

Figure 4:
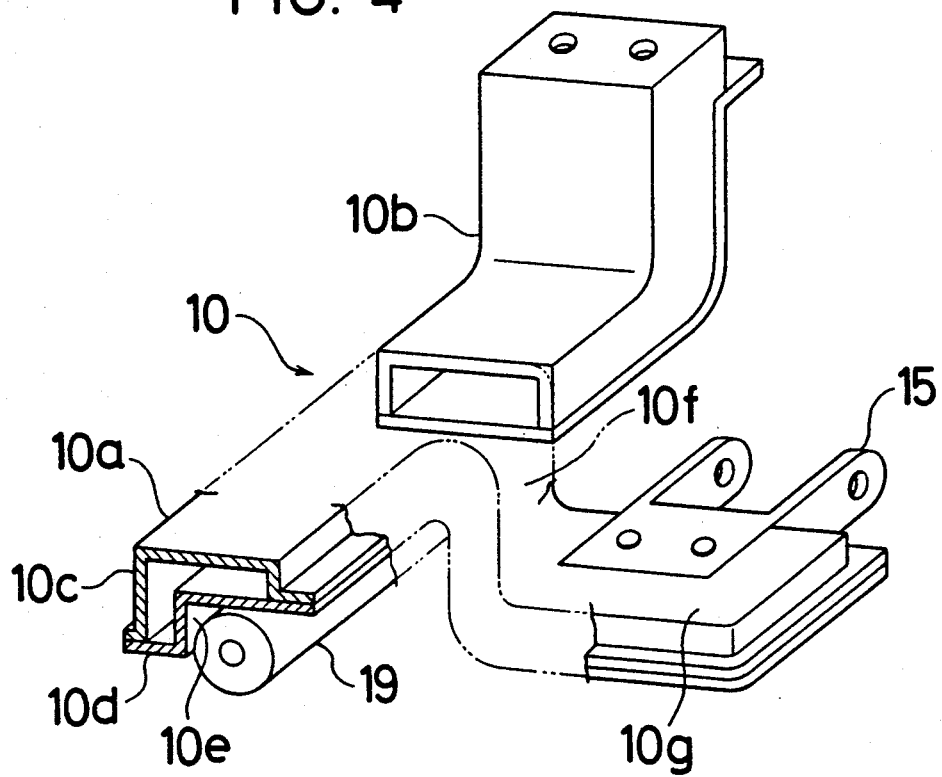

As shown in FIG. 4, the suspension front cross member 10 comprises a center portion 10a located at the center of the widthwise direction of the vehicle body, and a side portion 10b connected with both ends of the center portion 10a and extending further in the widthwise direction to be connected, at the outer end thereof, with the front side frame 3.

The center portion 10a is composed by coupling an upper panel 10c and a lower panel 10d, both having a L-shaped cross-section, to form an L-shaped cross-section therein. This structure results in the formation of a transversely extending small space in the lower position of the center portion 10a. This small space serves as a housing portion 10e. Formed on each right and left end of the center portion 10a is a horizontal portion 10g extending rearwardly through a downwardly-curved vertical portion 10f. A supporting bracket 15 is fitted, for example, with a bolt in order to swingably support the suspension lower arm 14. As shown in FIG. 1, a mounting bracket 10h for supporting the power plant 5 is mounted on the upper surface of the center portion 10a. The mounting bracket 10h includes an elastic body such as rubber therein, thereby elastically supporting the power plant 5.

Each side portion 10b is welded at both ends of the center portion 10a. The side portions 10b are upwardly bent toward the front side frames 3 so that the upper end portion thereof is welded to the lower end surface of the front side frame 3.

The suspension rear cross member 11 is provided in the vicinity of the rear end of the front side frame 3, and the central portion thereof is projected upwardly. In the same manner as the suspension front cross member 10, supporting brackets 16 for the suspension lower arms 14 project from the suspension rear cross member 11 on both right and left ends thereof. A mounting bracket 11a is fitted on the upper surface of the suspension rear cross member 11.

A center member 17 extending in the longitudinal direction of the vehicle body is interposed between the suspension front cross member 10 and the suspension rear cross member 11. The center member 17 which is downwardly curved at the central portion thereof is welded with the suspension front cross member 10 and the suspension rear cross member 11 at the area close to the mounting positions of the mounting bracket 10h, 11a.

Swingably fitted in the vertical direction of the vehicle body to the suspension lower arm supporting brackets 15, 16 on the suspension cross members 10, 11 are inner ends of a fork suspension lower arm 14 through which the front wheel 4 and the suspension (not shown in the drawings) are interconnected.

Figure 3:
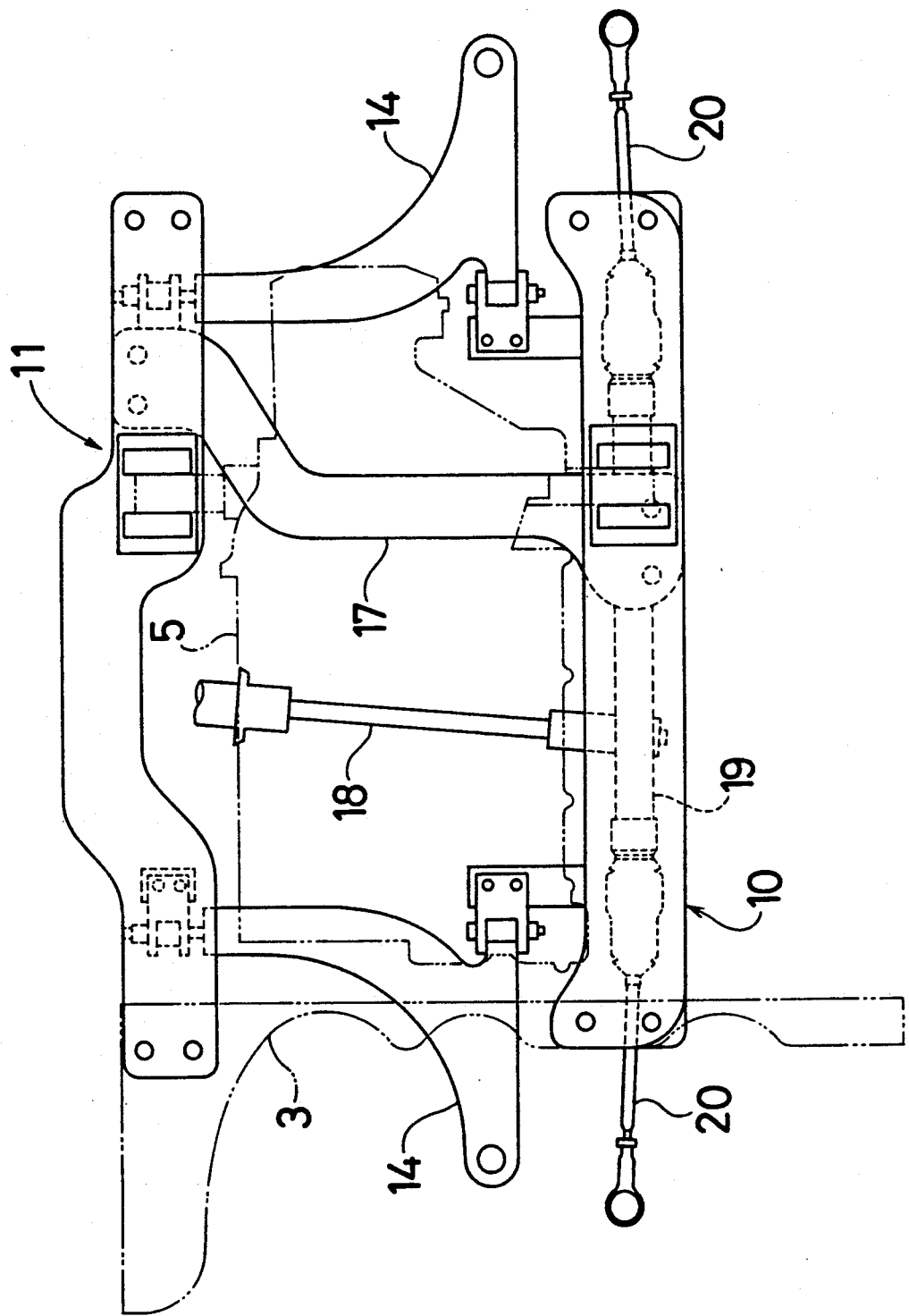

Referring now to FIGS. 2 and 3, reference numeral 18 indicates a steering shaft provided with a steering wheel (not shown in the drawings) at the upper end thereof. The lower end of the steering shaft 18 longitudinally extends in the lower position of the power plant 5 to be interconnected with a rack and pinion mechanism (a transmission mechanism) 19 at the front end portion thereof. This rack and pinion mechanism 19 includes a rack, and a rack member for housing and supporting the rack therein. The rack and pinion mechanism 19 is accommodated in the housing portion 10e formed in the suspension front cross member 10. This means that the L-shaped suspension front cross member 10 is disposed in the upper and forward position of the rack and pinion mechanism 19. Both right and left ends of the rack and pinion mechanism 19 are interconnected with the front wheels 4 by means of tie rods 20 and knuckle arms (not shown in the drawings). Accordingly, when turning the steering wheel, the steering shaft 18 rotates, and the tie rods 20 along with the rack travel in the widthwise direction of the vehicle body. Then, the knuckle arms pivotally move, thus steering the front wheels 4.

In accordance with this first embodiment, the rack and pinion mechanism 19 of the steering system is accommodated inside the housing portion 10e of the suspension front cross member 10. As a result, wider space for arranging the auxiliary components can be secured. Further, since a portion of the suspension front cross member 10 is disposed forward of the rack and pinion mechanism 19, the shock load does not directly act on the rack and pinion mechanism 19 in case of a head-on collision of the vehicle, thereby protecting the rack and pinion mechanism 19.

(b) Second Embodiment

The following is a description of the second embodiment of the present invention.

Figure 5:
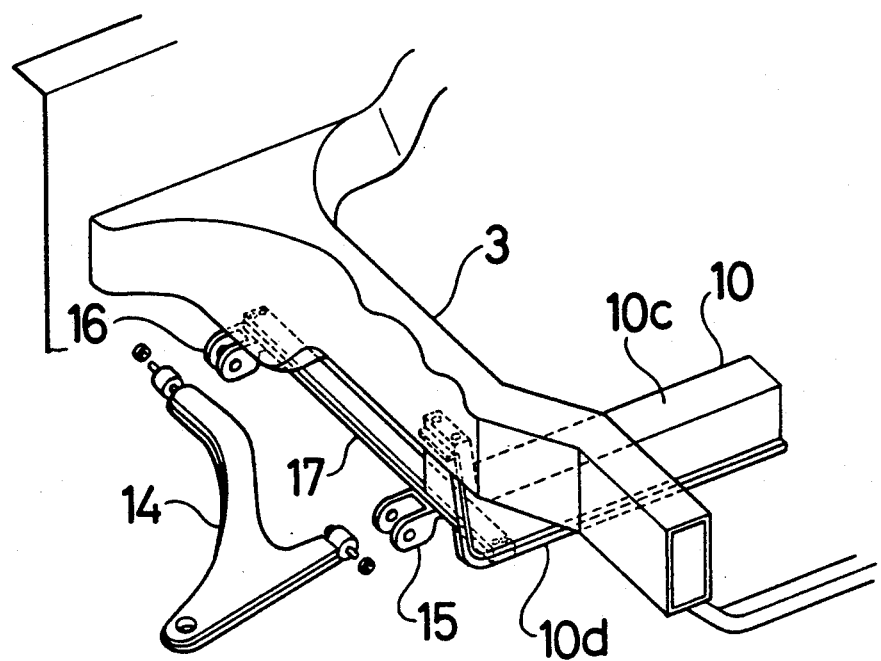
FIG. 5 is a perspective view of a second embodiment showing a vehicle body structure inside an engine compartment.

The difference of the second embodiment from the first embodiment can be seen in the supporting structure of the suspension lower arm 14 since the second embodiment employs an alternate form of the cross members 10, 11. As shown in FIG. 5, a suspension front cross member 10 is composed of only two members, i.e. an upper panel 10c and a lower panel 10d. Right and left center members 17 having suspension lower arm supporting brackets 15, 16 are welded to the lower ends of the suspension front cross member 10.

According to this structure, since the front cross member 10 is composed of only two members, rigidity thereof is improved along with further efficient protection of the rack and pinion mechanism.

(c) Third Embodiment

Figure 6:
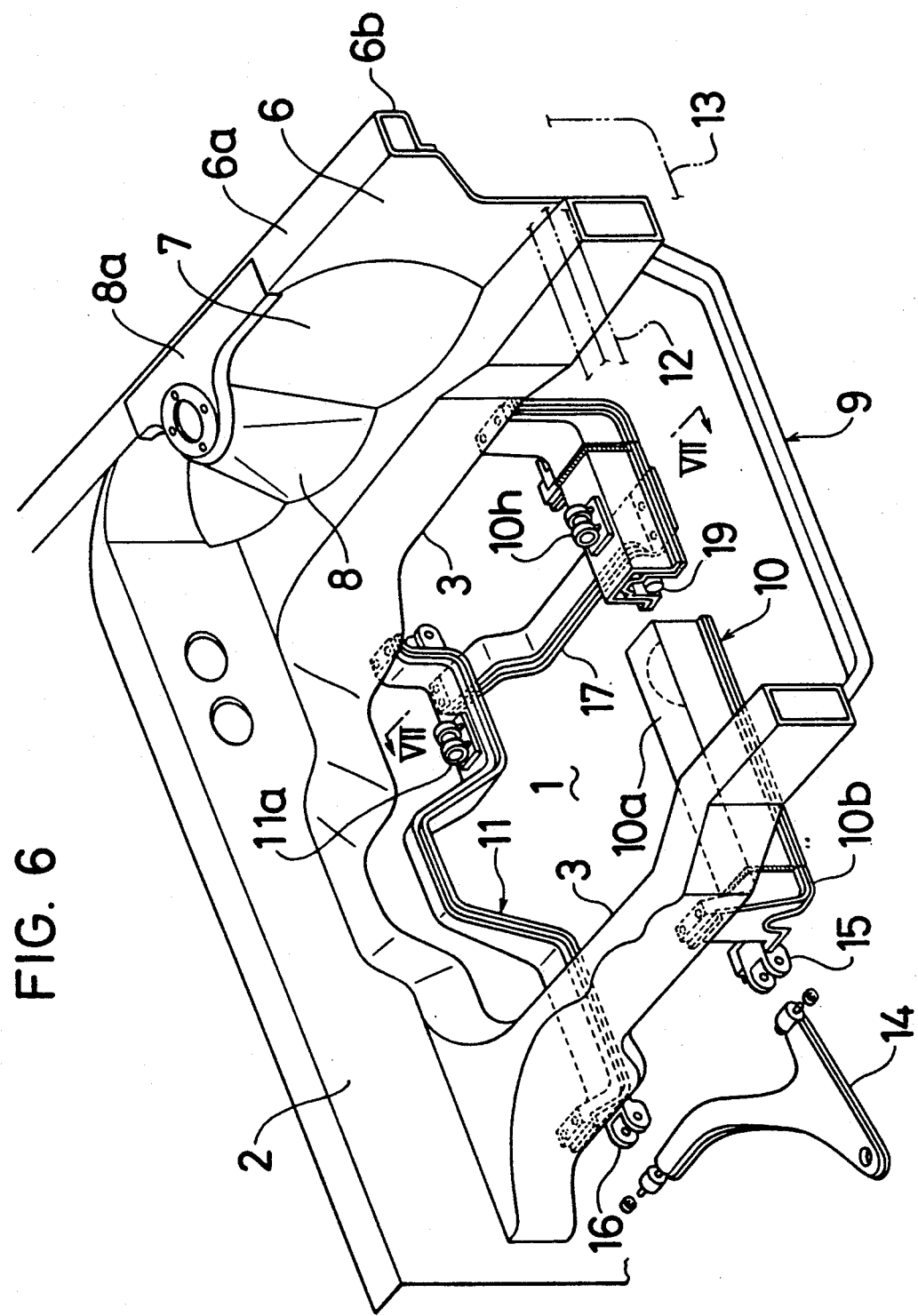
Figure 7:
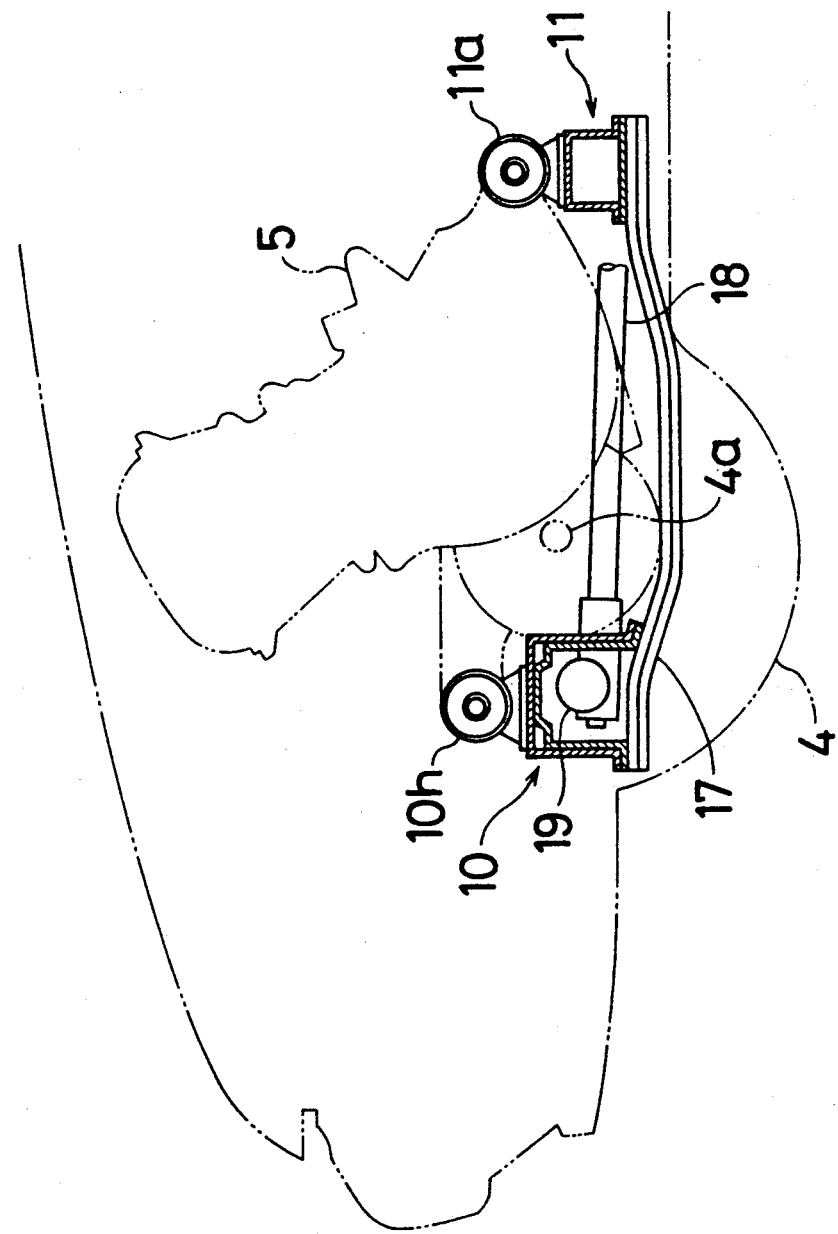

The first and the second embodiments have employed the suspension front cross members 10 having the L-shapes cross-section. However, the third embodiment employs the suspension front cross member 10 having a U-shaped cross section as shown in FIGS. 6 and 7.

What is claimed is:

1. A front structure of a motor vehicle comprising:
a vehicle cabin;
an engine compartment provided in the front of said vehicle cabin;
an engine mounted in said engine compartment;
a steering wheel installed in said vehicle cabin and having a steering shaft extending into said engine compartment;
a tie rod provided in a widthwise direction of the vehicle body inside said engine compartment;
a transmission mechanism provided forward of said engine inside said engine compartment, said transmission mechanism interconnecting said steering shaft and said tie rod;
a front cross member provided in the widthwise direction forward of said engine, said front cross member having a housing portion accommodating said transmission mechanism at a lower part thereof; and
front side frames mounted in a longitudinal direction of the vehicle body on right and left sides of said engine compartment, said front cross member being connected to and extending between said front side frames.

2. A front structure of a motor vehicle as defined in claim 1 further comprising an axle of front wheels provided in said engine compartment, said engine disposed in the rearward position of said axle.

3. A front structure of a motor vehicle as defined in claim 1 further comprising a supporting bracket disposed at the widthwise end of said front cross member, a lower arm swingably interconnected with said supporting bracket, and a suspension interconnected with said lower arm.

4. A front structure of a motor vehicle as defined in claim 1 further comprising a mounting bracket provided at the widthwise center of said front cross member in order to support said engine.

5. A front structure of a motor vehicle as defined in claim 1 wherein said steering shaft is interconnected with said transmission mechanism through the lower position of said engine.

6. A front structure of a motor vehicle as defined in claim 1 wherein said transmission mechanism comprises a rack and pinion mechanism.

7. A front structure of a motor vehicle as defined in claim 1 further comprising:
 a rear cross member disposed in the widthwise direction of the vehicle body in the rearward position of said front cross member inside said engine compartment;
 a center member interconnecting a widthwise end portion of said front cross member and a widthwise end portion of said rear cross member;
 a supporting bracket provided in said center member;
 a lower arm swingably interconnected with said supporting bracket;
 a suspension interconnected with said lower arm; and
 wherein said front cross member is composed by joining an upper panel and a lower panel.

8. A front structure of a motor vehicle as defined in claim 1 wherein a central portion in the widthwise direction of the vehicle body of said front cross member is composed by coupling an upper panel having a U-shaped cross-section and a lower panel having a U-shaped cross-section, and said housing portion is formed under said lower panel.

9. A front structure of a motor vehicle comprising:
 a vehicle cabin;
 an engine compartment provided in the front of said vehicle cabin;
 an engine mounted in said engine compartment;
 a steering wheel mounted in said vehicle cabin and having a steering shaft extending into said engine compartment;
 a tie rod extending in a widthwise direction of the vehicle inside said engine compartment;
 a transmission mechanism provided forward of said engine inside said engine compartment, said transmission mechanism interconnecting said steering shaft and said tie rod; and
 a front cross member extending in said widthwise direction forward of said engine inside said engine compartment, said front cross member having a housing portion accommodating said transmission mechanism at a lower part thereof, a central portion in said widthwise direction of said front cross member including an upper panel having an L-shaped cross-section and a lower panel having an L-shaped cross-section, said housing portion being formed under said lower panel.

10. A front structure of a motor vehicle comprising:
 a vehicle cabin;
 an engine compartment provided in the front of said vehicle cabin;
 an engine mounted in said engine compartment;
 a steering wheel mounted in said vehicle cabin and having a steering shaft extending into said engine compartment;
 a tie rod extending in a widthwise direction of the vehicle body inside said engine compartment;
 a transmission mechanism provided forward of said engine inside said engine compartment, said transmission mechanism interconnecting said steering shaft and said tie rod;
 a front cross member extending in said widthwise direction forward of said engine inside said engine compartment, said front cross member having a housing portion accommodating said transmission mechanism at a lower part thereof, said front cross member including a central portion in said widthwise direction provided with at least a side wall part arranged in front of said transmission mechanism and an upper wall part arranged above said transmission mechanism and formed integrally with said side wall part, said upper wall part covering an upper part of said transmission mechanism.

* * * * *